(12) United States Patent
Noda (10) Patent No.: US 12,535,471 B2
(45) Date of Patent: Jan. 27, 2026

(54) WAVEFORM INFORMATION INFERENCE METHOD AND DEVICE, AND PEAK WAVEFORM PROCESSING METHOD AND DEVICE

(71) Applicant: Shimadzu Corporation, Kyoto (JP)

(72) Inventor: Akira Noda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 403 days.

(21) Appl. No.: 17/918,259

(22) PCT Filed: Jan. 13, 2021

(86) PCT No.: PCT/JP2021/000823
§ 371 (c)(1),
(2) Date: Oct. 11, 2022

(87) PCT Pub. No.: WO2021/210228
PCT Pub. Date: Oct. 21, 2021

(65) Prior Publication Data
US 2023/0160862 A1    May 25, 2023

(30) Foreign Application Priority Data

Apr. 17, 2020 (JP) ................................. 2020-073946

(51) Int. Cl.
*G01N 30/86* (2006.01)
(52) U.S. Cl.
CPC ..... *G01N 30/8631* (2013.01); *G01N 30/8693* (2013.01)
(58) Field of Classification Search
None
See application file for complete search history.

(56) References Cited

U.S. PATENT DOCUMENTS

2017/0336370 A1   11/2017   Noda
2022/0128532 A1   4/2022    Kanazawa et al.

FOREIGN PATENT DOCUMENTS

CN    110364186 A    10/2019
JP    202042598 A    3/2020
(Continued)

OTHER PUBLICATIONS

First Office Action dated Jul. 11, 2023 issued for the corresponding Japanese Patent Application No. 2022-515206.
(Continued)

*Primary Examiner* — Walter L Lindsay, Jr.
*Assistant Examiner* — Geoffrey T Evans
(74) *Attorney, Agent, or Firm* — Muir Patent Law, PLLC (57) ABSTRACT

A waveform information inference device according to one mode of the present invention includes: a waveform extraction unit (31) configured to extract a partial waveform to be modeled from a signal waveform acquired based on actual measurement using a predetermined analysis device; and an adversarial learning unit (32) configured to acquire a model function corresponding to the partial waveform, or the model function and shape distribution information in the function by performing adversarial learning using two mutually adversarial models which are a generation model and a discriminative model using the partial waveform obtained by the waveform extraction unit as an input. The present invention can acquire a precision peak model function and its shape parameter distribution information.

11 Claims, 8 Drawing Sheets

(56) References Cited

FOREIGN PATENT DOCUMENTS

WO  2016035167 A1  3/2016
WO  2020070786 A1  4/2020

OTHER PUBLICATIONS

"Let's check peak waveform processing", Shimadzu Corporation, searched on Dec. 2, 2019, downloaded on Jul. 28, 2022, available at: http://www.an.shimadzu.co.jp/hplc/support/lib/lctalk/23/23lab.htm.
Goodfellow et al., "Generative Adversarial Nets", searched on Dec. 2, 2019, available at: https://arxiv.org/pdf/1406.2661.pdf.
Radford et al., "Unsupervised Representation Learning with Deep Convolutional Generative Adversarial Networks", searched on Dec. 2, 2019, available at: https://arxiv.org/abs/1511.06434.
Written Opinion of the International Searching Authority (ISA237) for PCT application PCT/JP2021/000823, dated Apr. 6, 2021.
First Office Action dated Aug. 8, 2023 issued for the corresponding Chinese Patent Application No. 202180028313.6.

WAVEFORM INFORMATION INFERENCE METHOD AND DEVICE, AND PEAK WAVEFORM PROCESSING METHOD AND DEVICE

TECHNICAL FIELD

The present invention relates to a method and device for inferring information about a signal waveform obtained by various analysis devices and measurement devices, and a peak waveform processing method and device using the method and device. Note that the "signal waveform" in this specification includes not only the waveform itself obtained by analysis and measurement, but also the waveform created by processing the signal obtained by analysis and measurement.

BACKGROUND ART

In a liquid chromatograph (LC) or gas chromatograph (GC), a chromatogram is acquired by performing chromatographic analysis on a sample, and a peak corresponding to a component (compound in general) contained in the sample is observed in the chromatogram. Since the position of the peak (retention time) observed in the chromatogram corresponds to the component in the sample, the component can be specified, that is, qualitatively determined from the peak position. Since the area or height of the peak observed in the chromatogram corresponds to the amount of content or concentration of the component corresponding to that peak, the component can be quantitatively determined from the area value or height value. Therefore, to improve the precision in qualitative and quantitative determination based on the chromatogram, it is important to determine the position of a peak top of the peak appearing in the chromatogram or the area value or height value of the peak with high precision.

In general, the waveform of a peak on a chromatogram is ideally shaped according to the Gaussian distribution. However, excessive leading or tailing is observed in an actually obtained peak on the chromatogram due to various factors. They include baseline drift, and an overlap of a plurality of peaks derived from different components caused by insufficient separation. In such various situations, it is not easy to accurately detect the peak and to determine the area and height of the peak with high precision. Various techniques and algorithm are conventionally used for peak detection.

For example, Non Patent Literature 1 discloses a waveform processing method for setting an appropriate baseline correction line for a given chromatogram and for appropriately separating overlapping peaks based on the baseline correction line to calculate an integrated area value of each separated peak.

Patent Literature 1 also describes a method of fitting a prepared model function to a peak waveform on the chromatogram, and calculating feature values such as the peak area value and height value based on the fitted model function.

Such a technique of fitting a model function is used for various observed waveforms other than the peak waveform. For example, quantitative analysis based on a chromatogram uses a calibration curve indicating the relationship between the peak area value and substance concentration (or content), and least-square fitting is often performed using such a calibration curve as a polynomial or exponential function. Stability tests and pharmacokinetic studies of pharmaceuticals observe temporal changes in resolution of target substances and temporal changes in metabolites. Also in those cases, a model function is applied to a smoothly varying observed waveform, and then statistical analysis is performed.

In general, the classical peak detection method as disclosed in Non Patent Literature 1 assumes that the waveform is in relatively good state, such as noise is relatively small or the signal is stationary. Therefore, if these conditions are not met, accurate peak detection cannot be performed in many cases. In general, the method using fitting of a model function enables more accurate peak detection.

CITATION LIST

Patent Literature

Patent Literature 1: WO 2016/035167 A

Non Patent Literature

Non Patent Literature 1: "Let's check peak waveform processing", [online], Shimadzu Corporation, [searched on Dec. 2, 2019], Internet
Non Patent Literature 2: Alec Radford, two others, "Unsupervised Representation Learning with Deep Convolutional Generative Adversarial Networks", [online], [searched on Dec. 2, 2019], Internet
Non Patent Literature 3: Ian J. Goodfellow, seven others, "Generative Adversarial Nets", [online], [searched on Dec. 2, 2019], Internet

SUMMARY OF INVENTION

Technical Problem

When applying the peak detection method using fitting of the model function to a chromatogram, as described in Patent Literature 1, an exponential modified Gaussian (EMG) function is often used as the model function. The reason is that, although a peak waveform of a chromatogram is ideally close to the Gaussian waveform, an actual peak waveform is often asymmetric due to tailing. However, even if the model function is corrected considering such tailing, it is difficult to perform exact fitting especially around the foot of the peak, and some error in peak shape may still occur.

To improve the matching degree of the peak waveform shape by fitting, it is effective to increase the number of parameters that define the model function, that is, shape parameters. However, as the number of parameters increases, the formula representing the model function becomes more ill-posed problematic and more susceptible to noise. This is mainly because, although a parameter group for shape correction to be added should in principle fall within a specific range (distribution) in close cooperation with tailing parameters of the EMG function and the like, it is impractical to design such a sophisticated model function because such calculations need a large amount of labor and time.

When a peak to be observed is derived from a single component, the influence of the peak shape error due to the factors described above on the peak area is small. However, when two peaks derived from different components overlap and it is necessary to separate the peaks, the peak shape error may have a large influence on the area of each peak. In recent years, in the field of instrumental analysis, there has been a demand for simultaneous analysis of a plurality of components in a sample. It goes without saying that it is difficult to completely separate a plurality of components by only chromatographic analysis alone, and even the combination of chromatography and mass spectrometry may not be able to completely separate the plurality of components. Therefore, it is important to reduce peak shape errors without increasing the shape parameters when acquiring the peak area value and the like by using fitting of the model function for improving the quantitative performance of components.

The present invention has been made to solve such a problem. A main object of the invention is to provide a waveform information inference method and device that can improve precision while inhibiting an increase in the number of parameters for the model function used for peak detection, extraction of the peak feature value, and the like without much effort or time.

Another object of the present invention is to provide a peak waveform processing method and device that can accurately detect peaks observed in a chromatogram or in a spectrum, separate overlapping peaks with high precision, and calculate precise feature values from the detected peaks by using such waveform information inference method and device.

Solution to Problem

One mode of a waveform information inference method according to the present invention that has been made to solve one of the above problems is a method for inferring waveform information about a signal waveform by using a computer, the method including:
a waveform extraction step of extracting a partial waveform to be modeled from the signal waveform acquired based on actual measurement using a predetermined analysis device; and
an adversarial learning step of acquiring a model function corresponding to the partial waveform, or the model function and shape distribution information in the model function by performing adversarial learning using two mutually adversarial models which are a generation model and a discriminative model using the partial waveform obtained in the waveform extraction step as an input.

One mode of a waveform information inference device according to the present invention that has been made to solve one of the above problems is a device for implementing the waveform information inference method of the mode according to the present invention, and the waveform information inference device includes:
a waveform extraction unit configured to extract a partial waveform to be modeled from a signal waveform acquired based on actual measurement using a predetermined analysis device; and
an adversarial learning unit configured to acquire a model function corresponding to the partial waveform, or the model function and shape distribution information in the model function by performing adversarial learning using two mutually adversarial models which are a generation model and a discriminative model using the partial waveform obtained by the waveform extraction unit as an input.

One mode of a peak waveform processing method according to the present invention that has been made to solve one of the above problems is a peak waveform processing method using the waveform information inference method of the above mode, in which
the partial waveform is a peak waveform, and
the method includes: further performing a model waveform generation step of generating a peak model waveform by using the model function obtained in the adversarial learning step; and performing peak detection on a target signal waveform by using the peak model waveform.

Another mode of the peak waveform processing method according to the present invention is a peak waveform processing method using the waveform information inference method of the above mode, in which
the partial waveform is a peak waveform, and
the method includes further performing a processing step of performing waveform processing to separate a plurality of overlapping peaks in a target signal waveform by using the model function obtained in the adversarial learning step.

One mode of a peak waveform processing device according to the present invention that has been made to solve one of the above problems is a peak waveform processing device using the waveform information inference device of the above mode, in which
the partial waveform is a peak waveform, and
the device further includes a model waveform generation unit configured to generate a peak model waveform by using the model function obtained by the adversarial learning unit, and the device is configured to perform peak detection on a target signal waveform by using the peak model waveform.

Another mode of the peak waveform processing device according to the present invention is a peak waveform processing device using the waveform information inference device of the above mode, in which
the partial waveform is a peak waveform, and
the device includes a waveform processing unit configured to perform waveform processing to separate a plurality of overlapping peaks in a target signal waveform by using the model function obtained by the adversarial learning unit.

In the present invention, the technique of analysis and measurement in the analysis device is arbitrary, but typically can be a device capable of acquiring the signal waveform in which the peak corresponding to the component in the sample (compound, element, or the like) is observed, such as a chromatograph device, a mass spectrometer, a nuclear magnetic resonance device, an optical analysis device, and an X-ray analysis device. The signal waveform is not limited to that in which a peak is observed, but it may be that in which a characteristic waveform is observed. The signal waveform mentioned here can include not only the signal waveform obtained directly from analysis and measurement in the analysis device, but also a calibration curve created based on analysis results and measurement results and the like.

Advantageous Effects of Invention

The waveform information inference method and device of the above mode according to the present invention can acquire the model function corresponding to the partial waveform extracted from the signal waveform and distribution (probability distribution) information about the fluctuation (variation) of the model function, for example, by using a generative adversarial network (hereinafter referred to as "GAN"), which is a technique of machine learning disclosed in Non Patent Literatures 2 and 3 and the like. When learning by the GAN, for example, the peak waveform extracted from the chromatogram obtained by actually analyzing the sample with the chromatograph device is given as real data.

Even if the type of analysis device is the same, the shape of the signal waveform may differ greatly depending on the type of sample to be analyzed or the type of component contained in the sample (category and the like). Even if such a plurality of signal waveforms with greatly different shapes are used as real data for learning by the GAN, learning is not performed properly, and it is difficult to obtain the desired precision generation model. Therefore, by not performing general-purpose analysis that does not limit the type of sample, but by limiting the type of sample, type of component, purpose of analysis, application field, and the like to some extent, it is preferable to perform GAN learning using the partial waveform with similar waveform shape, that is, waveform shape that is uniform to some extent, as real data.

Note that the adversarial learning does not necessarily have to be the GAN using the neural network (GAN mentioned here is GAN in a broad sense having the basic GAN structure, and includes various improved versions such as Wasserstein GAN (WGAN) and WGAN-gp). Instead of the neural network, algorithm that outputs a function capable of approximating distribution of the data based on the data to be learned may be used.

The waveform information inference method and device of the above mode according to the present invention can acquire with high precision, for example, the model function for modeling the partial waveform such as the peak in the chromatogram obtained by the chromatograph device with high precision and information on the waveform shape distribution of the model function.

The peak waveform processing method and device of one mode according to the present invention can more accurately detect the peak observed in the chromatogram and the like to be analyzed by using the precision model function and waveform distribution information obtained as described above for peak detection. The peak waveform processing method and device of another mode according to the present invention can separate a plurality of peaks with high accuracy even when the peaks overlap on the chromatogram or spectrum. Peak feature values such as area values and height values of the thus detected peaks or separated peaks can be obtained with high precision. Accordingly, the quantitative precision of the component in the sample can be improved.

Since the model function and the waveform distribution information on the function are known, it is possible to rationally calculate the range of error the peak feature value can take, such as the peak area value and height value determined from the chromatogram to be analyzed. Accordingly, for example, it is possible to accurately evaluate whether the feature value of the peak obtained by other waveform processing methods is appropriate.

DESCRIPTION OF EMBODIMENTS

A data analysis device using a waveform information inference device according to one embodiment of the present invention will be described below with reference to the accompanying drawings.

In the example below, the signal waveform to be analyzed is a chromatogram waveform, a peak observed on the chromatogram is detected, and the peak top position (retention time) and peak area value (or height value) of the peak are determined by data analysis.

[Overall Configuration and Schematic Operation of LC Device of One Embodiment]

Figure 1:
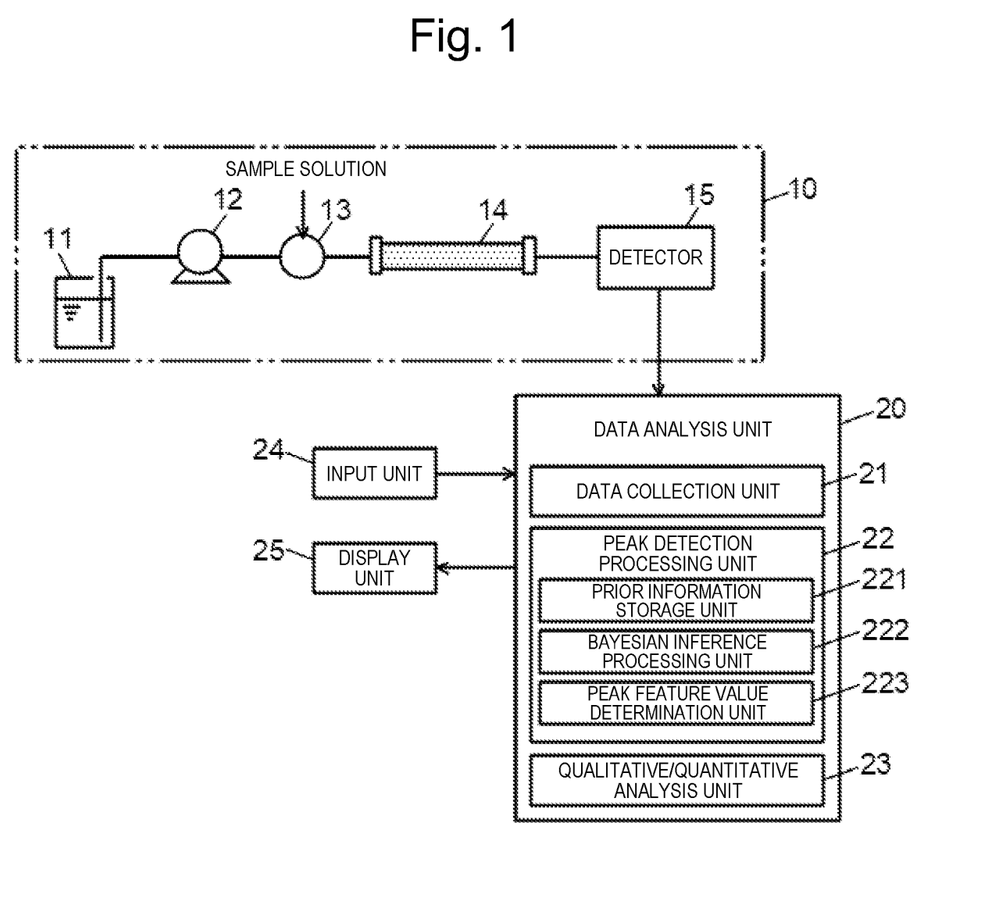
FIG. 1 is a schematic configuration diagram of one embodiment of an LC device including a data analysis device including a waveform information inference device according to the present invention.

FIG. 1 is an overall configuration diagram of one embodiment of an LC device including a data analysis device including a waveform information inference device according to the present invention.

In FIG. 1, a measurement unit 10 includes a mobile phase container 11, a pump 12 that sucks a mobile phase and delivers the mobile phase at a substantially constant flow rate (or amount of flow), an injector 13 that supplies a sample solution into the mobile phase, a column 14 that separates a component contained in the sample solution according to retention time, and a detector 15 that detects the component in an eluate flowing out of the column 14. As the detector 15, for example, an optical detector such as a photodiode array (PDA) detector or a mass spectrometer can be used.

A data analysis unit 20 has a function of digitizing and processing a detection signal output from the detector 15, and includes functional blocks such as a data collection unit 21, a peak detection processing unit 22, and a qualitative/quantitative analysis unit 23. The peak detection processing unit 22 includes functional blocks such as a prior information storage unit 221, a Bayesian inference processing unit 222, and a peak feature value determination unit 223. An input unit 24 and a display unit 25, which serve as user interfaces, are connected to the data analysis unit 20

The data analysis unit 20 is essentially a general-purpose computer. The computer executes dedicated software (computer program) installed on the computer, thereby implementing functions of each functional block as shown in FIG. 1. Of course, it is also possible to implement part of the functions of these functional blocks with a dedicated hardware circuit or the like.

In the LC device, the pump 12 sucks the mobile phase stored in the mobile phase container 11 and sends and supplies the mobile phase to the column 14 at a substantially constant flow rate. The injector 13 supplies a predetermined amount of sample solution prepared in advance to the mobile phase at predetermined timing in response to an instruction from a control unit (not shown). The supplied sample solution is introduced into the column 14 by the flow of mobile phase. Various components contained in the sample solution are separated in the time direction and eluted while passing through the column 14. The detector 15 detects the component contained in the eluate and outputs a detection signal of intensity according to the amount of component from moment to moment.

In the data analysis unit 20, the data collection unit 21 samples the detection signal at predetermined time intervals, converts the sampled detection signal into digital data, and stores the digital data in a storage device. This stored data is data that constitutes the chromatogram waveform (chromatogram data). The component detected by the detector 15 is observed as a peak on the chromatogram. The peak detection processing unit 22 receives the chromatogram data and detects a significant peak, and determines the position (time) of peak top of the detected peak and the area value (or height value) of the peak. The qualitative/quantitative analysis unit 23 specifies the component from information on the position of each peak on the chromatogram and uses the calibration curve created in advance to calculate content of each component from the peak area value (or height value). That is, the qualitative/quantitative analysis unit 23 performs qualitative and quantitative determination on each component contained in the sample, and outputs the result to the display unit 25.

[Peak Detection Method and Peak Feature Value Calculation Method]

To detect the peak appearing in the chromatogram to be analyzed and obtain the peak area value as a feature value of the peak, the LC device of the present embodiment uses peak fitting based on the Bayesian inference.

In the chromatogram, the peak waveform corresponding to the component in the sample can be represented by a function $f(t, Z)$ that takes the shape parameter $Z$ and the retention time t as arguments. Here, the shape parameter $Z$ is, for example, a parameter related to or presumed to be related to the peak width or spread of the foot. As is well known, the Bayesian inference can infer a posterior distribution from a prior distribution of parameters of a certain function and actual data. If both a peak model function $f(t, Z)$ and probability distribution of the shape parameter $Z$ are known, posterior probability $p(Z|D)$ when a certain chromatogram waveform D is given as an observed waveform is determined from the probability $p(D|Z)$ related to the model function and probability $p(Z)$ of the shape parameter $Z$ by using the Bayesian inference. Assuming that the peak model function $f(t, Z)$ has, for example, normal noise with standard deviation $\sigma$, the probability $p(D|Z)$ can be given by $p(D|Z) = N(f(t, Z), \sigma)$. Here, the function N is a normal distribution.

When the posterior distribution, which is the probability distribution of the parameter $Z$, is determined by the Bayesian inference in this way, the probability distribution of the shape of the peak model function $f(t, Z_0)$ can be obtained from the posterior distribution. That is, the peak model function indicating a waveform shape that is properly fitted to the peak waveform observed on the chromatogram waveform D is determined stochastically. Therefore, for example, when probability of a function indicating a certain waveform shape is significantly high, it can be determined that the waveform shape represents the peak waveform on a given chromatogram. Furthermore, based on the function $f(t, Z_0)$, desired peak feature values such as the area value, height value, or peak position of the peak can be calculated.

From the probability distribution of the shape of the peak model function $f(t, Z_0)$, the probability distribution of the peak feature value such as the area value and height value of the peak on the chromatogram can also be calculated. As a result, it is possible to determine the range of possible values of the peak area, height, or position, for example, with the credible interval of the probability distribution set to 95%.

Note that as described in Patent Literature 1, even in a situation where the foot of a plurality of peaks existing close to each other overlap, by performing the Bayesian inference incorporating a mixture distribution assuming that a plurality of peaks exists, each peak can be separated to obtain each peak feature value.

[Model Function and Method for Calculating Waveform Distribution Information]

As described above, to apply the fitting technique by the Bayesian inference to the peak waveform, the peak model function and the distribution of the shape parameter on the function (prior distribution) are needed. Generally, the Gaussian function, EMG function, and the like are used as the model function for the peak waveform. In contrast, here, without using such an explicit model function, by using a machine learning technique of learning the function itself representing the peak waveform and the distribution of the shape that the function can have (distribution of shape parameter), the peak model function and the parameter distribution information on the function according to the type and method of the chromatographic device and characteristics of the application field of the analysis are inferred.

Figure 2:
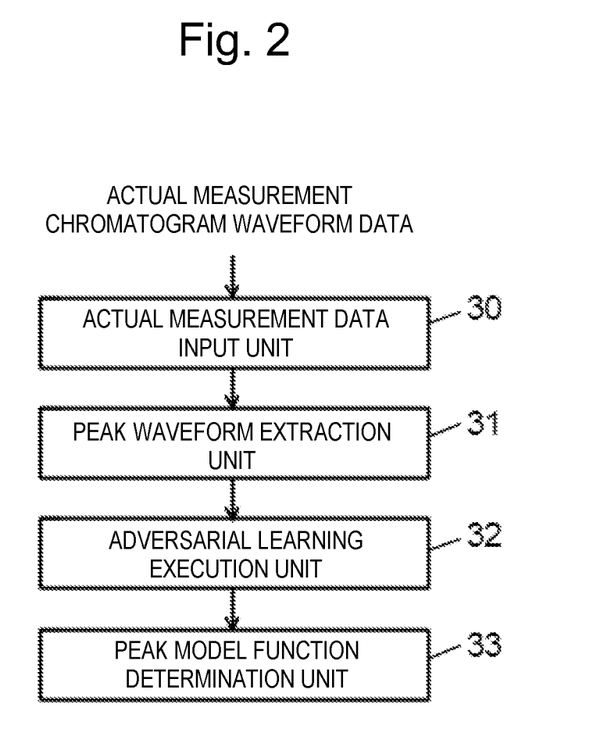
FIG. 2 is a functional block diagram of one embodiment of the waveform information inference device according to the present invention.

FIG. 2 is a schematic configuration diagram of one embodiment of the waveform information inference device for inferring the peak model function and parameter distribution information. This device includes functional blocks such as an actual measurement data input unit 30, a peak waveform extraction unit 31, an adversarial learning execution unit 32, and a peak model function determination unit 33. This device is essentially a computer. The computer executes a predetermined program (software) installed on the computer, thereby embodying each functional block as shown in FIG. 2.

Figure 3:
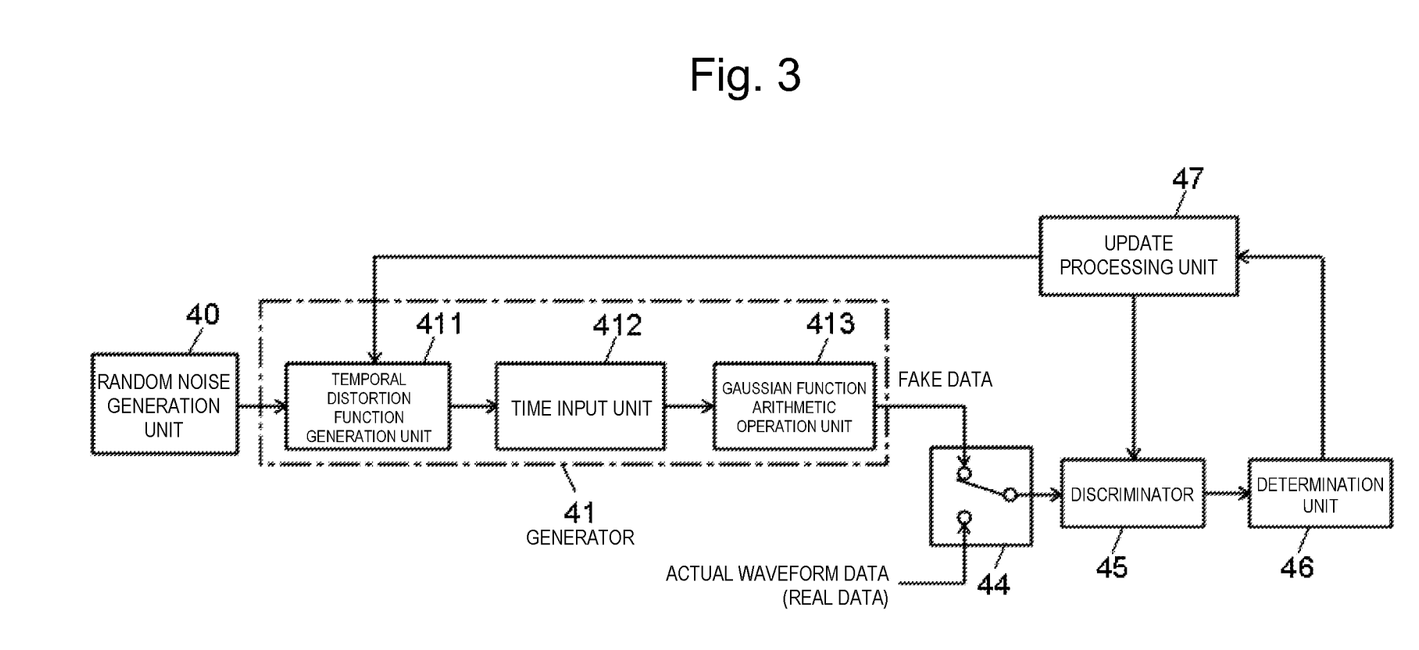
FIG. 3 is a functional block diagram of an adversarial learning execution unit in the waveform information inference device shown in FIG. 2.

FIG. 3 is a functional block configuration diagram of GAN used by the adversarial learning execution unit 32 in FIG. 2. Note that the device shown in FIGS. 2 and 3 may be included in the data analysis unit 20 of the LC device shown in FIG. 1. That is, the data analysis computer of the LC device may achieve the above functions, and the method for achieving the above functions may be separate from the data analysis unit 20.

In the waveform information inference device shown in FIGS. 2 and 3, the chromatogram waveform obtained from actual measurement is used as real data for adversarial learning by the GAN. That is, the chromatogram waveform acquired by using the measurement unit 10 of the LC device shown in FIG. 1 or an equivalent LC device and actually measuring the sample is used as real data.

However, there is a large difference in the shape of the peak waveform even if it is generally called a peak waveform on a chromatogram, depending on the type of sample, that is, type of component, application field and purpose of analysis, LC separation conditions, and the like. When a plurality of peak waveforms with such a large difference in shape, for example, both a peak waveform that tends to have large tailing and a peak waveform that tends to show almost no tailing are to be analyzed, a problem arises that the distribution of the peak model function is too wide and the precision of the function is lowered, or that the parameter distribution is too wide. Therefore, such a problem can be avoided by narrowing down the analysis application field. Specifically, here, the field to be analyzed is limited to the analysis of biologically derived metabolites. That is, the sample is a biological sample and the component in the sample is metabolites. This is of course just one example, and the technique described here can be applied to various samples, components, or analytical purposes.

In the waveform information inference device shown in FIG. 2, the actual measurement data input unit 30 reads a lot of chromatogram data obtained by actual measurement. The peak waveform extraction unit 31 performs processing for extracting the peak with a good waveform shape by removing, for example, the peak with extremely low SN ratio or the peak with insufficient separation on each input chromatogram data. Then, the peak waveform extraction unit 31 determines a predetermined peak shape parameter, such as degree of tailing (or leading) or peak width, for the extracted peak. Note that, for example, when a correlation between parameters can be predicted, such as when there is a proportional relationship between the retention time and peak width, to facilitate the learning described below, normalization processing can be performed in advance to weaken the correlation between parameters, such as normalizing the peak width by the retention time in advance.

In this way, the peak waveform extraction unit 31 acquires the peak shape parameter of a lot of single peaks. The adversarial learning execution unit 32 performs learning by the GAN using the peak shape parameter of the single peak having a good waveform shape as real data.

As shown in FIG. 3, the adversarial learning execution unit 32 includes a random noise generation unit 40, a generator 41, a data selection unit 44, a discriminator 45, a determination unit 46, and an update processing unit 47. The generator 41 includes a temporal distortion function generation unit 411, a time input unit 412, and a Gaussian function arithmetic operation unit 413. Here, for both the temporal distortion function generation unit 411 in the generator 41 and the discriminator 45, the neural network as described in Non Patent Literatures 2 and 3 is used.

The general idea of GAN is that the generator generates fake data that resembles real data, and that the discriminator alternately discriminates between the fake data and the real data. That is, the generator learns the parameters of the peak waveform itself. In contrast, the algorithm in the GAN used by the adversarial learning execution unit 32 in the present embodiment is improved as follows.

As already described, the peak waveform on the chromatogram ideally follows the Gaussian function, but actually, deviation from the Gaussian waveform shape occurs due to various factors. Therefore, this deviation is defined as a temporal distortion function s(t, Z) representing temporal distortion, and the temporal distortion function generation unit 411 in the generator 41 generates this temporal distortion function s(t, Z) by the neural network. The time input unit 412 adds the temporal distortion function s(t, Z) to the time t, which is a parameter on the horizontal axis of the chromatogram, for transfer to the Gaussian function arithmetic operation unit 413. The Gaussian function arithmetic operation unit 413 performs a Gaussian function arithmetic operation with t+s(t, Z) as an argument and outputs a waveform according to the Gaussian function Gauss (t+s(t, Z)) including a temporal distortion element.

However, while the temporal distortion function s(t, Z) and the function f(t, Z) representing the original peak waveform are a continuous function related to time t, actual measurement data obtained by the measurement is a set of discrete data observed at each sampling time. Therefore, such a function cannot be directly used for the generator 41 of the GAN. Therefore, here, instead of the temporal distortion function s(t, Z), which is a continuous function, the discrete temporal distortion function s(T, Z) using a vector T indicating each sampling time of the actual measurement data is output as a function generated by the temporal distortion function generation unit 411.

That is, when executing learning, the temporal distortion function generation unit 411 creates the temporal distortion function s(T, Z) by the neural network based on noise input from the random noise generation unit 40. The time input unit 412 adds the vector T corresponding to the time t having the same size as the vector size of the given real data to the discrete temporal distortion function s(T, Z) output from the temporal distortion function generation unit 411. In response, the Gaussian function arithmetic operation unit 413 generates a waveform according to the Gaussian function Gauss (T+s(T, Z)), that is, a fake peak waveform. The fake waveform data output at this time has the same size as the real waveform vector to be learned.

The data selection unit 44 alternately switches between the fake waveform data output from the generator 41 and the real waveform data and inputs the data to the discriminator 45. The discriminator 45 discriminates whether the input data is real. The determination unit 46 determines whether the discrimination result is correct, that is, when real data is input to the discriminator 45, the determination unit determines whether the data is discriminated as real, and meanwhile, when fake data is input to the discriminator 45, the determination unit determines whether the data is discriminated as fake.

Based on the determination result by the determination unit 46, the update processing unit 47 updates a coefficient of the neural network in the temporal distortion function generation unit 411 such that the fake data approaches the real data. In addition, the update processing unit 47 updates the coefficient of the neural network in the discriminator 45 such that the discrimination performance of the discriminator 45 improves. As is well known, while making the generator 41 and the discriminator 45 compete in this way, the GAN performs learning so as to improve the performance of the generator and the discriminator.

By learning by the GAN as described above, the generator 41 now generates a fake peak waveform that is very close to the real peak waveform. In the learning process, the peak model function that approximates the peak waveform and distribution information on the parameters of the function (that is, probability distribution of waveform shape) are obtained. The peak model function determination unit 33 determines the peak model function representing the peak waveform shape and the distribution of the shape parameter based on the result of the above-described learning in the GAN performed by the adversarial learning execution unit 32.

The generator 41 in the waveform information inference device of the present embodiment limits the function generated by the temporal distortion function generation unit 411 to minute temporal distortion and uses Gauss (T+s(T, Z)) incorporating the function as a peak model function. Accordingly, instead of the entire peak waveform on the chromatogram, it is only required to generate only a small temporal distortion part when the peak waveform on the chromatogram is approximated by the Gaussian function by GAN learning. This facilitates precision learning.

In the GAN, the distribution of the shape parameter Z is a probability distribution. Therefore, this distribution of the shape parameter Z can be used as it is for the prior distribution when the Bayesian inference is performed. Therefore, the distribution of the peak model function f(t, Z) itself does no need to be described explicitly. When performing the Bayesian inference, inference can be performed assuming that there exists a function f(t, Z) that simply transforms the random variable Z.

Figure 4:
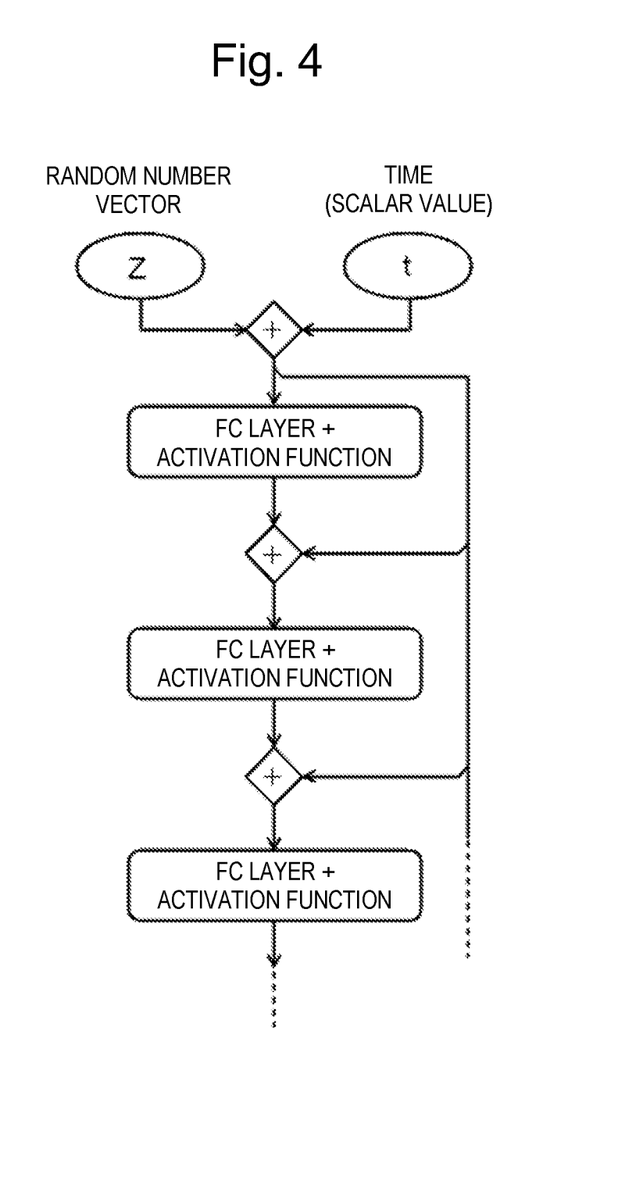
FIG. 4 is a diagram showing a network configuration example in a generator in FIG. 3.

FIG. 4 is a diagram showing one example of the network configuration in the temporal distortion function generation unit 411 of the generator 41 in FIG. 3. As shown in this figure, in this example, the temporal distortion function generation unit 411 combines the random number vector Z given from the random noise generation unit 40 with time t, which is a scalar value, and receives the combination as one vector. Then, this vector is applied to the network of a full connect (FC) layer and an activation function. Normally, since peak tailing is strongly influenced directly by the parameter t, in this example, the input of the first layer is added to the input of each subsequent layer. However, it is of course possible to use an arbitrary neural network configuration as the temporal distortion function generation unit 411 without being limited to this configuration.

Meanwhile, a general neural network may be used as the discriminator 45, but here, to better capture a bell-shaped waveform such as the Gaussian function, the neural network having a one-dimensional convolutional layer and a linear combination layer is used.

More preferably, to obtain the distribution indicated by $s(t, Z) \approx t$, skipped connection is used for the network of the function $s(t, Z)$, or assuming $s(t, Z)=t+s'(t, Z)$, initial value distribution of network weight parameters is preferably adjusted such that $s'(t, Z)$ takes a value near 0 with an appropriate width.

It is considered that there is distortion that is substantially uniformly applied to strength, such as a heavy foot of the bell-shaped function. In that case, it is also useful to use the intensity correction neural network function $i(y)$ and use the function $i(Gauss(s(t, Z))$ as the generator 41. The network configuration of this function i can also be described in the same network configuration as shown in FIG. 4, in a similar manner to the function s.

In the above description, the essential purpose of the adversarial learning execution unit 32 is to learn a distribution that matches the distribution of the data point group, and in the above example, the GAN is used as the learning technique. As described in Non Patent Literatures 2 and 3, it is common to use the neural networks in the GAN, but as is apparent from the description in Non Patent Literature 3, instead of the neural network, appropriate algorithm that can optimize a function using differentiation (gradient) can be used. Here, the Kullback-Leibler (KL) distance is used as the similarity to the distribution of the function f generated from the observed waveform D and the shape parameter Z. In addition to the KL distance, various indicators for evaluating the degree of matching of distributions, such as Jensen-Shannon (JS) distance and Wasserstein distance, can be used.

Considering the shape of leading and tailing of the peak waveform, it is reasonable to assume monotonicity for the temporal distortion function $s(t, Z)$. Therefore, a neural network incorporating monotonicity may be used.

A neural network is created that takes, for example, (t, Z) as arguments and outputs values of A, a, b, c, and d. Among these, A, a, and c are not negative. The neural network having non-negative output can be created by using the exponential linear units (ELU) function to which 1 is added or the RELU function as an activation function. By using the outputs A, a, b, c, and d obtained in this way and calculating $s(t, Z)=c*t+d+\Sigma A*sigmoid(t*a+b)$, the temporal distortion function that satisfies monotonicity can be created. In the above example, the temporal distortion function is a model in which an inflection point due to the composition of a plurality of sigmoid functions exists in a straight line indicated by $ct+d$.

Figure 5:
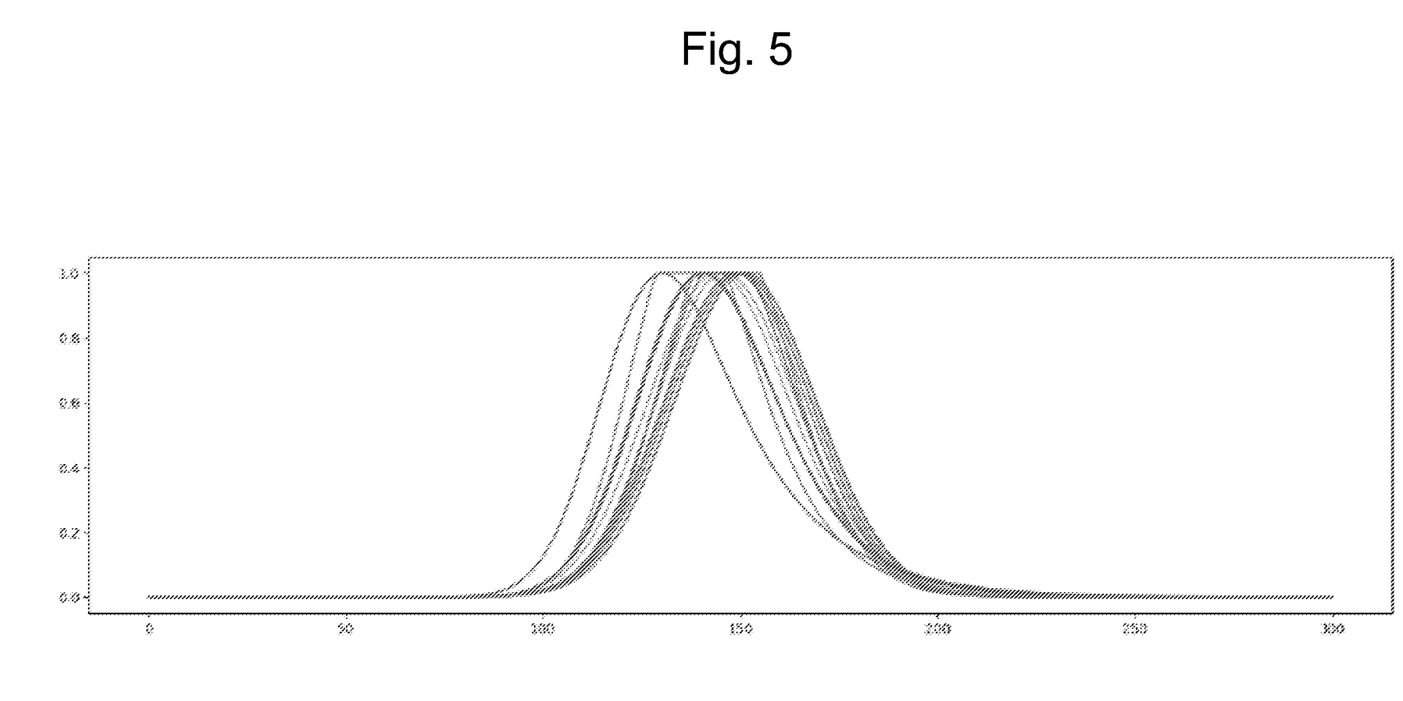
FIG. 5 is a diagram showing one example of GAN input data (real waveform data).
Figure 6:
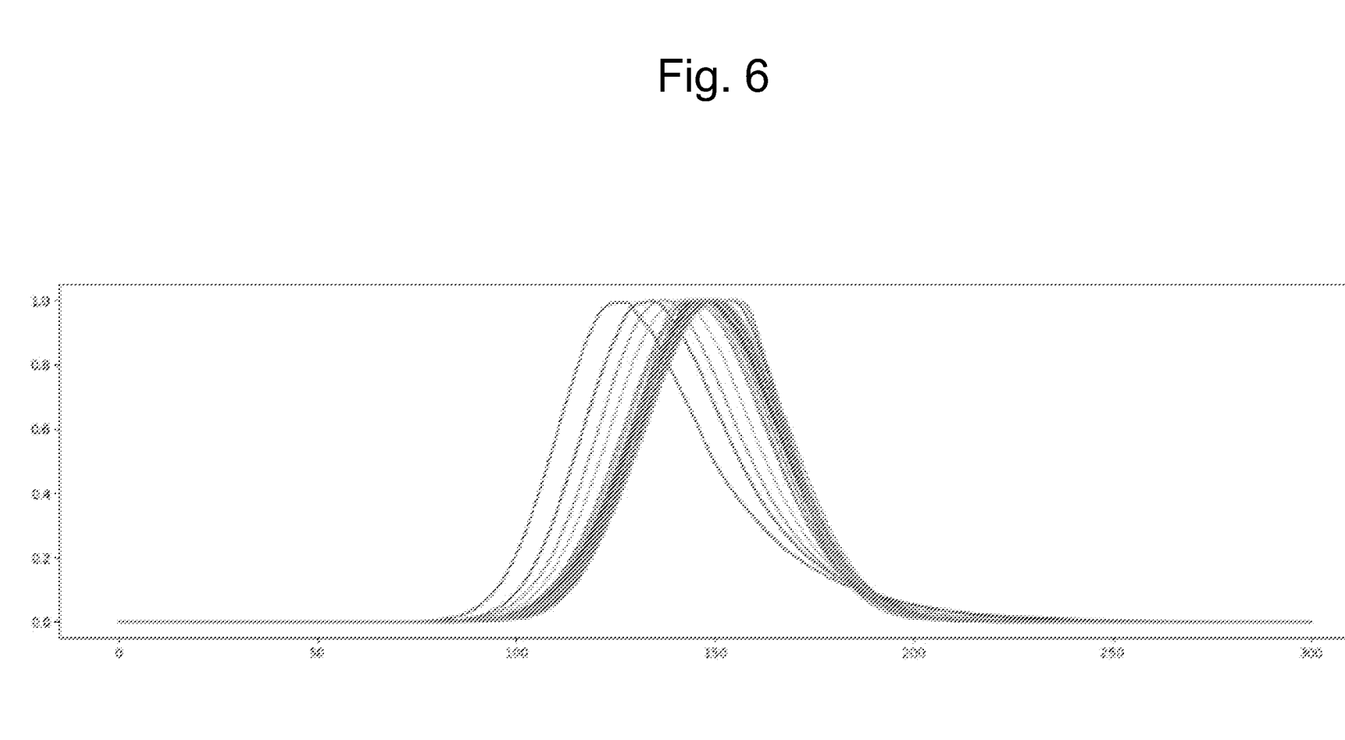
FIG. 6 is a diagram showing one example of GAN output data (fake waveform data).

FIG. 5 is a diagram showing part of real peak waveform data used for learning by the GAN. Meanwhile, FIG. 6 is a diagram showing part of fake peak waveform data generated by the generator 41. Both FIGS. 5 and 6 are a plurality of waveforms overwritten randomly. As can be seen by comparing these waveforms, learning by the GAN makes it possible to obtain a generation model that can output fake peak waveform data that is very close to real peak waveform data (substantially indistinguishable).

By the processing as described above, the generation model that simulates the waveform based on the peak waveform observed on the actually measured chromatograph, that is, the peak model function and shape parameter distribution information can be obtained. By storing the data in the prior information storage unit 221 in the device shown in FIG. 1 for use as a prior distribution when the Bayesian inference processing unit 222 performs the Bayesian inference, the peak detection processing unit 22 can detect the peak with high precision and calculate the peak feature value such as peak quantitative value more accurately.

That is, when parameters are inferred by using the Bayesian inference, a posterior distribution $Z_0$ of the shape parameter Z is obtained for the target observed waveform data $D_0$. By sampling the inferred posterior distribution $Z_0$ thus obtained, the shape of the specific peak shape sample $Gauss(T+f(T, Z_0))$ can be obtained. Therefore, based on the shape, it is only required to calculate the distribution of desired peak feature values such as peak area values. $f(t, Z)$ obtained by machine learning as described above is a function with t as an argument in a similar manner to the EMG function and the like. Therefore, $f(t, Z)$ still has the advantages of the model function that distribution of the parameter Z by the Bayesian inference and posterior prediction distribution of the function f can be used, and can be easily applied to the Bayesian inference.

In practice, it is often necessary to handle mixed peaks where the feet of adjacent peaks overlap and the like. However, it can be considered that linearity in analysis is ensured in many analysis devices such as the LC device and the GC device. Therefore, when the analysis target is a chromatogram waveform, the signal value of the mixed peak may be simple addition of signal values corresponding to a plurality of single peaks. In addition to information such as peak width and foot spread, distribution information such as the peak position and height is necessary for the Bayesian inference. However, for the chromatogram, it is common to consider the distribution of these parameters independently, and apart from the shape parameter such as peak width, the distribution can be inferred. Therefore, even in the mixed distribution in which the plurality of peaks overlap, by performing the Bayesian inference under the assumption that the plurality of peaks exists, the peaks can be substantially separated and the peak feature values such as the peak area of each peak can be determined.

The above-described technique according to the present invention can of course be used to calculate the peak feature value such as verification of presence/absence of peak and inference of the peak position, besides calculation of the peak area. To perform peak detection, peak separation, or calculation of the peak feature value by using the peak model function, techniques other than the Bayesian inference may be used. Specifically, a simpler method such as the maximum likelihood inference method and the least squares method, which are frequently used for peak waveform fitting, may be used. Even in that case, since the original peak model function is obtained with high precision, peak detection, peak separation, and the like can be performed with high precision.

[Application to Other than Peak Waveform Analysis]

In the above description, the technique according to the present invention has been applied to the analysis of peak on the chromatogram, but can be used to analyze other waveforms. For example, the calibration curve used to determine the component concentration (content) and the like from the peak area is also a kind of signal waveform. Similar analysis is possible for the calibration curve. Of course, the shape of the calibration curve usually does not follow the Gaussian function, but instead of using the Gaussian function, it is possible to perform modeling by using the function $g(t+f(t, Z), Z)$. This technique can also be applied to the analysis of waveform that indicates the temporal pattern of the amount of change in the amount of drug reaction, and the like.

Figure 7:
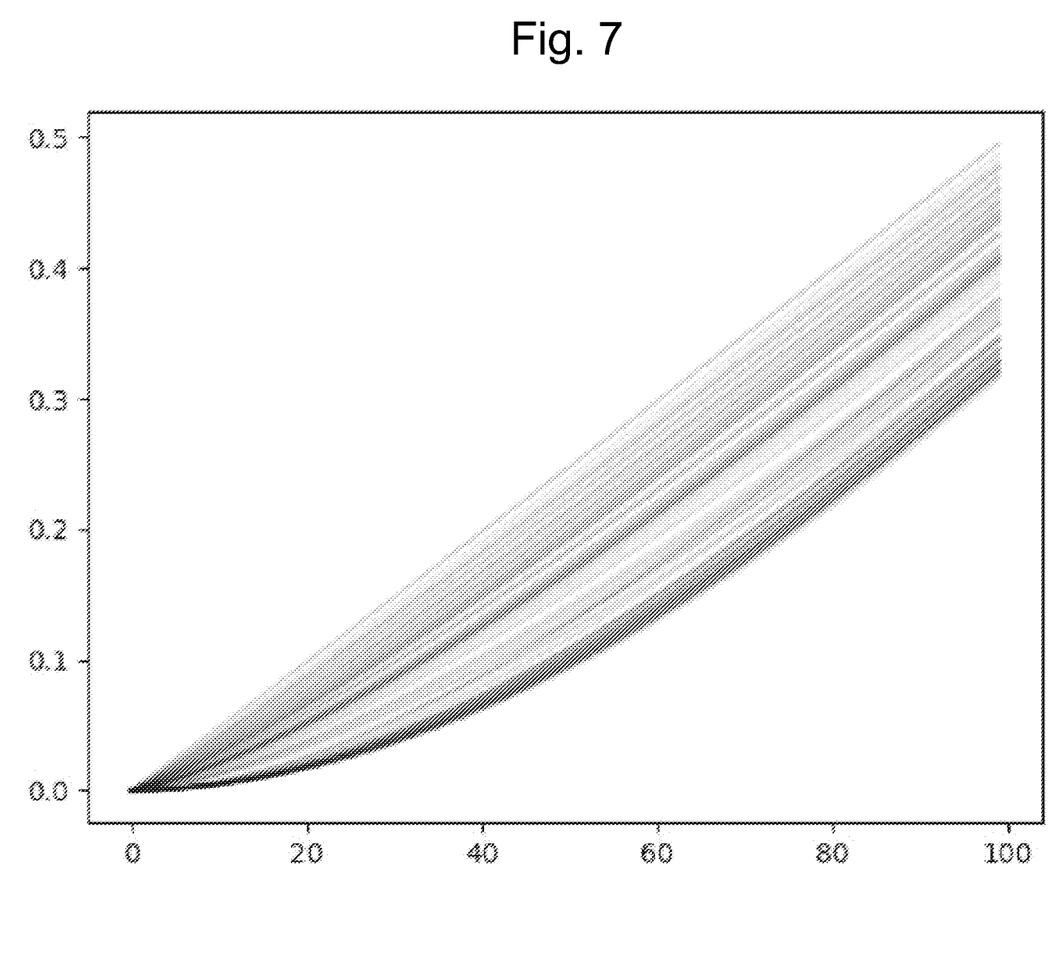
FIG. 7 is a diagram showing one example of the GAN input data (real data) for a calibration curve.
Figure 8:
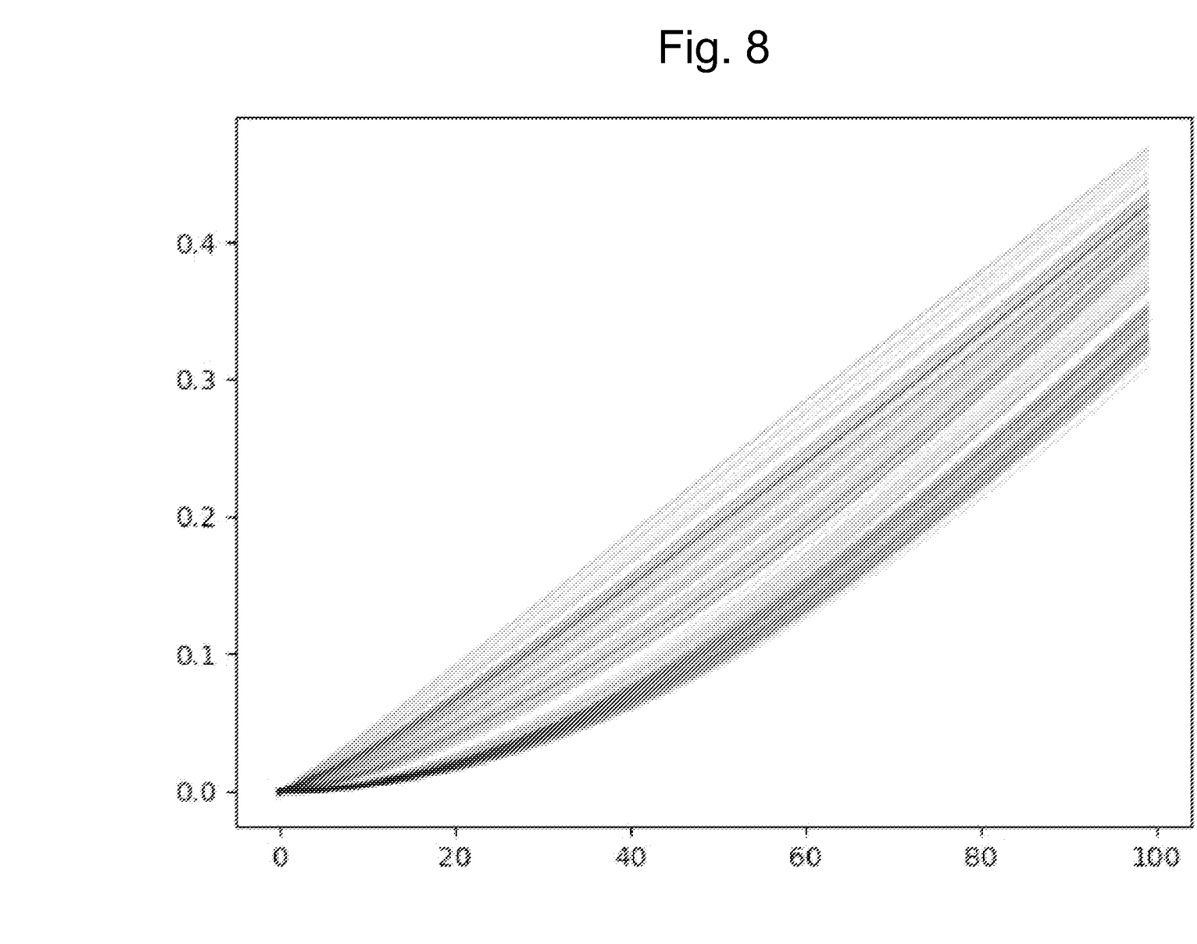
FIG. 8 is a diagram showing one example of the GAN output data (fake data) for a calibration curve.

FIG. 7 is a diagram showing part of real data used when creating the generation model that simulates the calibration curve by learning by the GAN. Meanwhile, FIG. 8 is a diagram showing part of fake data generated by the generator. Both FIGS. 7 and 8 are a plurality of waveforms overwritten randomly. As can be seen by comparing these waveforms, it is possible to obtain a generation model that can output fake data that is very close to real data (substantially indistinguishable) when simulating the calibration curve as well.

The above example has created only the temporal distortion function f related to time t by the neural network to describe the transformation function. However, the transfer function $g(Gauss(T), Z)$ can also be described by using the function $g(x, Z)$ related to intensity x rather than time. This is based on the assumption that distortion occurs according to intensity rather than time. For example, in the LC device using an absorptiometer or the like as a detector, this is suitable for describing the model function when signal saturation occurs in a high-density region and the peak top collapses. Naturally, the function f and the function g can be combined and written as $g(Gauss(T+f(T, Z)), Z)$.

The above embodiment is an example in which the present invention is applied to the LC device, but it is apparent that the present invention can be applied when signal waveforms obtained with various analysis devices other than the LC device and the GC device are processed or analyzed.

[Various Modes]

It will be understood by those skilled in the art that the exemplary embodiment described above is a specific example of the following modes.

(Clause 1) One mode of a waveform information inference method according to the present invention is a method for inferring waveform information about a signal waveform by using a computer, the method including:

a waveform extraction step of extracting a partial waveform to be modeled from the signal waveform acquired based on actual measurement using a predetermined analysis device; and an adversarial learning step of acquiring a model function corresponding to the partial waveform, or the model function and shape distribution information in the model function by performing adversarial learning using two mutually adversarial models which are a generation model and a discriminative model using the partial waveform obtained in the waveform extraction step as an input.

(Clause 9) One mode of a waveform information inference device according to the present invention includes:

a waveform extraction unit configured to extract a partial waveform to be modeled from a signal waveform acquired based on actual measurement using a predetermined analysis device; and an adversarial learning unit configured to acquire a model function corresponding to the partial waveform, or the model function and shape distribution information in the model function by performing adversarial learning using two mutually adversarial models which are a generation model and a discriminative model using the partial waveform obtained by the waveform extraction unit as an input.

The waveform information inference method described in Clause 1 or the waveform information inference device described in Clause 9 may acquire with high accuracy, for example, the model function for modeling the partial waveform such as the peak in the chromatogram obtained by the chromatograph device with high precision and shape parameter of the model function, for example, distribution information such as the degree of peak tailing and peak width.

By using the model function and parameter distribution information obtained in this way, for example, for peak detection, it is possible to more accurately detect peaks observed in the chromatogram or the like to be analyzed. It is also possible to improve the precision of calculation of peak feature values such as peak area values and height values. Accordingly, the qualitative precision and quantitative precision of the component in the sample can be improved.

Since the model function and the parameter distribution information are known, it is possible to rationally calculate the peak position determined from the chromatogram to be analyzed or the range of error of the peak feature value, such as the area value and height value. Accordingly, for example, it is possible to accurately evaluate whether the feature value of the peak obtained by other waveform processing methods is appropriate.

(Clause 2) In the waveform information inference method described in Clause 1, the adversarial learning step may include performing processing for: generating a partial function representing a distortion element when the partial waveform is approximated by a predetermined function; introducing the partial function into the predetermined function; and outputting a fake waveform to be compared with the input partial waveform by using a parameter of a horizontal axis of the signal waveform as an argument of the function.

(Clause 10) In the waveform information inference device described in Clause 9, the adversarial learning unit may be configured to perform processing for: generating a partial function representing a distortion element when the partial waveform is approximated by a predetermined function; introducing the partial function into the predetermined function; and outputting a fake waveform to be compared with the input partial waveform by using a parameter of a horizontal axis of the signal waveform as an argument of the function.

In general GAN, the generation model generates a function for creating fake data that resembles the above real data. In the waveform information inference method described in Clause 2 and the waveform information inference device described in Clause 10, the generation model does not generate data representing the partial waveform itself, but a partial function representing only the distortion element when the partial waveform is approximated by a predetermined function. That is, this partial function does not create the partial waveform itself, but is a function representing distortion when the partial waveform is approximated by, for example, the Gaussian function. By introducing the generated partial function into a predetermined function with the parameter of the horizontal axis of the partial waveform as an argument, the data indicating the fake waveform is determined. The fake data and the real data are discriminated by using the discriminative model.

Since the partial function representing the distortion element is a function whose intensity fluctuation is much smaller than that of the function representing the original partial waveform itself, learning of the generation model in the GAN and the like is performed by enlarging minute intensity fluctuations. Therefore, it is possible to perform learning with higher precision than when learning the partial waveform itself, and it is possible to improve the calculation precision of the model function and the distribution of the shape parameter of the model function.

(Clause 3) In the waveform information inference method described in Clause 2, the partial waveform may be a peak waveform, and the distortion element may be a distortion function about the parameter of the horizontal axis of the peak waveform.

(Clause 11) Similarly, in the waveform information inference device described in Clause 10, the partial waveform may be a peak waveform, and the distortion element may be a distortion function about the parameter of the horizontal axis of the peak waveform.

That is, in the method described in Clause 3 and the device described in Clause 11, when the partial waveform is the peak waveform extracted from the chromatogram, the parameter of the horizontal axis is time, and therefore the partial function is a temporal distortion function.

(Clause 4, Clause 12) In the waveform information inference method described in Clause 3 and the waveform information inference device described in Clause 11, the parameter of the horizontal axis may be time.

The waveform information inference method described in Clause 4 and the waveform information inference device described in Clause 12 may obtain precision waveform information, for example, the model function for peaks on the chromatogram and the shape parameter distribution, and the like.

(Clause 5) The invention described in Clause 5 is a peak waveform processing method using the waveform information inference method described in any one of Clause 1 to Clause 4, in which
the partial waveform may be a peak waveform, and
the method may include: further performing a model waveform generation step of generating a peak model waveform by using the model function obtained in the adversarial learning step; and performing peak detection on a target signal waveform by using the peak model waveform.

(Clause 13) The invention described in Clause 13 is a peak waveform processing device using the waveform information inference device described in any one of Clause 9 to Clause 12, in which
the partial waveform may be a peak waveform, and
the device may further include a model waveform generation unit configured to generate a peak model waveform by using the model function obtained by the adversarial learning unit, and the device may be configured to perform peak detection on a target signal waveform by using the peak model waveform.

The peak waveform processing method described in Clause 5 and the peak waveform processing device described in Clause 13 may accurately perform peak detection by using the precision model function. Since the peak feature value such as the peak height value and area value can be obtained with high precision, for example, the quantitative precision of the target component can be improved.

(Clause 6) The invention described in Clause 6 is a peak waveform processing method using the waveform information inference method described in any one of Clause 1 to Clause 4, in which
the partial waveform may be a peak waveform, and
the method may include further performing a processing step of performing waveform processing to separate a plurality of overlapping peaks in a target signal waveform by using the model function obtained in the adversarial learning step.

(Clause 14) Similarly, the invention described in Clause 14 is a peak waveform processing device using the waveform information inference device described in any one of Clause 9 to Clause 12, in which
the partial waveform may be a peak waveform, and
the device may include a waveform processing unit configured to perform waveform processing to separate a plurality of overlapping peaks in a target signal waveform by using the model function obtained by the adversarial learning unit.

The peak waveform processing method described in Clause 6 and the peak waveform processing device described in Clause 14 may use a precision model function to separate a plurality of overlapping peaks with high precision, then may determine the peak feature value such as the height value and area value of each peak with high precision. This enables precision quantitative analysis of the component corresponding to each peak, for example, about overlapping peaks that are difficult to separate on the chromatogram by a conventional technique.

(Clause 7) The peak waveform processing method described in Clause 5 or Clause 6 may include further performing a feature value inference step of determining a predetermined feature value for each detected or separated peak.

(Clause 15) The peak waveform processing device described in Clause 13 or Clause 14 may further include a feature value inference unit configured to determine a predetermined feature value for each detected or separated peak.

The peak waveform processing method described in Clause 7 and the peak waveform processing device described in Clause 15 may perform, for example, precision quantitative analysis based on the chromatogram and spectrum.

(Clause 8, Clause 16) The peak waveform processing method described in any one of Clause 5 to Clause 7, or the peak waveform processing device described in any one of Clause 13 to Clause 15 may be configured to perform peak detection, peak separation, and/or inference of a predetermined feature value about the peak by using Bayesian inference.

The peak waveform processing method described in Clause 8 and the peak waveform processing device described in Clause 16 use the shape distribution information of the model function, for example, as a prior distribution when the peak in the chromatogram is detected or the peak feature value such as the area value is determined by using Bayesian inference. This makes it possible to accurately detect and separate peaks and to determine the peak feature value such as the peak area value with high precision. As a result, qualitative precision and quantitative precision can be improved.

REFERENCE SIGNS LIST

10 . . . Measurement Unit
11 . . . Mobile Phase Container
12 . . . Pump
13 . . . Injector
14 . . . Column
15 . . . Detector
20 . . . Data Analysis Unit
21 . . . Data Collection Unit
22 . . . Peak Detection Processing Unit
221 . . . Prior Information Storage Unit
222 . . . Bayesian Inference Processing Unit
223 . . . Peak Feature Value Determination Unit
23 . . . Qualitative/quantitative Analysis Unit
24 . . . Input Unit
25 . . . Display Unit
30 . . . Actual Measurement Data Input Unit
31 . . . Peak Waveform Extraction Unit
32 . . . Adversarial Learning Execution Unit
33 . . . Model Function Information Determination Unit
40 . . . Random Noise Generation Unit
41 . . . Generator
411 . . . Temporal Distortion Function Generation Unit
412 . . . Time Input Unit
413 . . . Gaussian Function Arithmetic Operation Unit
44 . . . Data Selection Unit
45 . . . Discriminator
46 . . . Determination Unit
47 . . . Update Processing Unit

The invention claimed is:

1. A waveform information inference method which is a method for inferring waveform information about a signal waveform of a chromatogram by using a computer, the method comprising:
a waveform extraction step of extracting a partial waveform to be modeled from the signal waveform of the chromatogram acquired based on actual measurement using a predetermined analysis device; and
an adversarial learning step of performing adversarial learning using two mutually adversarial models which are a generation model which outputs a generation waveform upon input of the partial waveform obtained in the waveform extraction step and a native model which outputs a determination result of whether the generation waveform is true or not,
wherein in the adversarial learning step, a coefficient of the generation model by inputting the partial waveform and a generation peak waveform which the generation model generates by using a model function and using the determination result,
wherein the partial waveform is a peak waveform, and
wherein the method further comprises,
a processing step of performing waveform processing to separate a plurality of overlapping peaks in a target signal waveform by using the model function.

2. The waveform information inference method according to claim 1, wherein the adversarial learning step includes performing processing for:
generating a partial function representing a distortion element when the partial waveform is approximated by a predetermined function;
introducing the partial function into the predetermined function; and
outputting a fake waveform to be compared with the input partial waveform by using a parameter of a horizontal axis of the signal waveform as an argument of the partial function.

3. The waveform information inference method according to claim 2, wherein the distortion element is a distortion function about the parameter of the horizontal axis of the peak waveform.

4. The waveform information inference method according to claim 3, wherein the parameter of the horizontal axis of the signal waveform is time.

5. A peak waveform processing method using the waveform information inference method according to claim 1,
wherein the partial waveform is a peak waveform, and
wherein the method includes:
further
performing peak detection on the target signal waveform by using a peak model waveform.

6. The peak waveform processing method according to claim 5, wherein the method includes further performing a feature value inference step of determining a predetermined feature value for each detected or separated peak.

7. The peak waveform processing method according to claim 5, wherein the method includes performing the peak detection, peak separation, and/or inference of a predetermined feature value about the peak by using Bayesian inference.

8. The waveform information inference method according to claim 1, wherein the partial waveform is a single peak waveform.

9. A waveform information inference device configured to infer waveform information about a signal waveform of a chromatogram comprising:
a waveform extraction unit configured to extract a partial waveform to be modeled from the signal waveform of the chromatogram acquired based on actual measurement using a predetermined analysis device; and
an adversarial learning unit configured to perform adversarial learning using two mutually adversarial models which are a generation model which outputs a generation waveform upon input of the partial waveform obtained by the waveform extraction unit as an input and a discriminative model which outputs a determination result of whether the generation waveform is true or not,
wherein in the adversarial learning unit updates a coefficient of the generation model by inputting the partial waveform and a generation peak waveform which the generation model generates by using a model function and using the determination result,
wherein the partial waveform is a peak waveform, and
wherein the device further comprises:
a processing unit configured to perform waveform processing to separate a plurality of overlapping peaks in a target signal waveform by using the model function.

10. A waveform information inference method which is a method for inferring waveform information about a signal waveform of a chromatogram by using a computer, the method comprising:
a waveform extraction step of extracting a partial waveform to be modeled from the signal waveform of the chromatogram acquired based on actual measurement using a predetermined analysis device; and an adversarial learning step of performing adversarial learning using two mutually adversarial models which are a generation model which outputs a generation waveform upon input of the partial waveform obtained in the waveform extraction step and a discriminative model which outputs a determination result of whether the generation waveform is true or not, wherein in the adversarial learning step, a coefficient of the generation model is updated by inputting the partial waveform and a generation peak waveform which the generation model generates by using a model function and using the determination result, wherein the partial waveform is a peak waveform, and wherein the method comprises:

a processing step of performing peak detection, peak separation, and/or inference of a predetermined feature value about the peak based on the determination result.

11. A waveform information inference method which is a method for inferring waveform information about a signal waveform of a chromatogram by using a computer, the method comprising:

a waveform extraction step of extracting a partial waveform to be modeled from the signal waveform of the chromatogram acquired based on actual measurement using a predetermined analysis device; and a learning step of acquiring a model function corresponding to the partial waveform, or the model function and shape distribution information in the model function by performing learning using the partial waveform obtained in the waveform extraction step as an input, wherein the learning step comprises an adversarial learning step of performing adversarial learning using two mutually adversarial models which are a generation model which outputs a generation waveform upon input of the partial waveform obtained in the waveform extraction step and a discriminative model which outputs a determination result of whether the generation waveform is true or not, wherein in the adversarial learning step, a coefficient of the generation model is updated by inputting the partial waveform and a generation peak waveform which the generation model generates by using the model function and using the determination result, and wherein the partial waveform is a peak waveform.

* * * * *